(12) United States Patent
Lyndon

(10) Patent No.: US 6,693,648 B1
(45) Date of Patent: Feb. 17, 2004

(54) POINTER INTERACTIVE APPARATUS

(75) Inventor: Troy A. Lyndon, Laguna Niguel, CA (US)

(73) Assignee: Campus Crusade for Christ, Inc., Orlando, FL (US)

(*) Notice: Subject to any disclaimer, the term of this patent is extended or adjusted under 35 U.S.C. 154(b) by 130 days.

(21) Appl. No.: 09/721,024

(22) Filed: Nov. 22, 2000

(51) Int. Cl.[7] .............................. G06F 15/16; G09G 5/00
(52) U.S. Cl. ...................... 345/744; 345/179; 345/716; 345/719; 345/738; 345/760; 709/217; 709/203
(58) Field of Search ................................. 345/156, 157, 345/179–183, 719, 721, 723, 738, 744, 760, 763, 716; 725/135, 136, 141, 147; 348/169; 709/203, 217

(56) References Cited

U.S. PATENT DOCUMENTS

| | | | |
|---|---|---|---|
| 5,612,900 A | | 3/1997 | Azadegan et al. ...... 364/514 R |
| 5,782,692 A | | 7/1998 | Stelovsky ...................... 463/1 |
| 5,819,004 A | | 10/1998 | Azadegan et al. .......... 386/112 |
| 5,841,425 A | * | 11/1998 | Zenz, Sr. ..................... 345/163 |
| 5,862,297 A | | 1/1999 | Timmermans ............... 386/70 |
| 5,898,429 A | * | 4/1999 | Trom et al. .................. 345/302 |
| 5,918,012 A | * | 6/1999 | Astiz et al. .................. 345/335 |
| 6,020,887 A | * | 2/2000 | Loring et al. ............... 345/340 |
| 6,026,232 A | | 2/2000 | Yogeshwar et al. ......... 395/615 |
| 6,065,042 A | * | 5/2000 | Reimer ........................ 345/326 |
| 6,144,972 A | * | 11/2000 | Abe et al. .................... 345/475 |
| 6,154,771 A | * | 11/2000 | Rangan et al. .............. 345/327 |
| 6,169,573 B1 | * | 1/2001 | Sampath-Kumar et al. . 348/169 |
| 6,175,840 B1 | * | 1/2001 | Chen et al. .................. 345/344 |
| 6,263,505 B1 | * | 7/2001 | Walker et al. ............... 725/110 |
| 6,330,595 B1 | * | 12/2001 | Ullman et al. .............. 709/219 |
| 6,384,861 B1 | * | 5/2002 | Lindsey ........................ 345/57 |
| 6,392,676 B1 | * | 5/2002 | Mori et al. .................. 345/163 |
| 6,396,544 B1 | * | 5/2002 | Schindler et al. ........... 348/461 |

* cited by examiner

Primary Examiner—Bipin Shalwala
Assistant Examiner—David L Lewis
(74) Attorney, Agent, or Firm—Lewis, Brisbois, Bisgaard & Smith LLP

(57) ABSTRACT

A pointer interactive apparatus for use with a computing device typically employed to identify and track the movement of a character or object of interest appearing in a video image on a monitor screen. In its most fundamental embodiment, the pointer interactive apparatus comprises a construction having a video source for providing a video image on a monitor screen. A current time code mechanism is associated with the video source for providing a current time code as a time reference on the video source. A pointer device cooperates with the current time code mechanism for identifying a specific location appearing on the video image over which the pointer device is positioned. A data storage mechanism provides stored data for comparing with the current time code and a plurality of input signals from the pointer device. An interpreter mechanism is connected to receive the video image including the current time code, the input signals from the pointer device, and the stored data from the data storage means for identifying and tracking the specific location appearing on the video image.

18 Claims, 9 Drawing Sheets

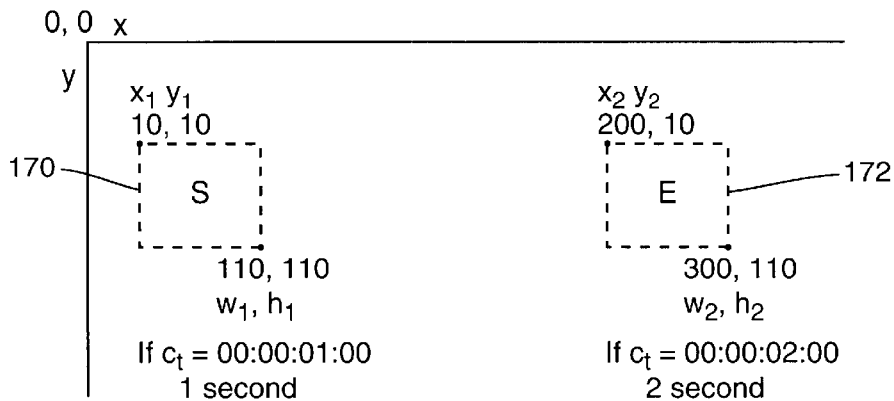
FIG. 2a
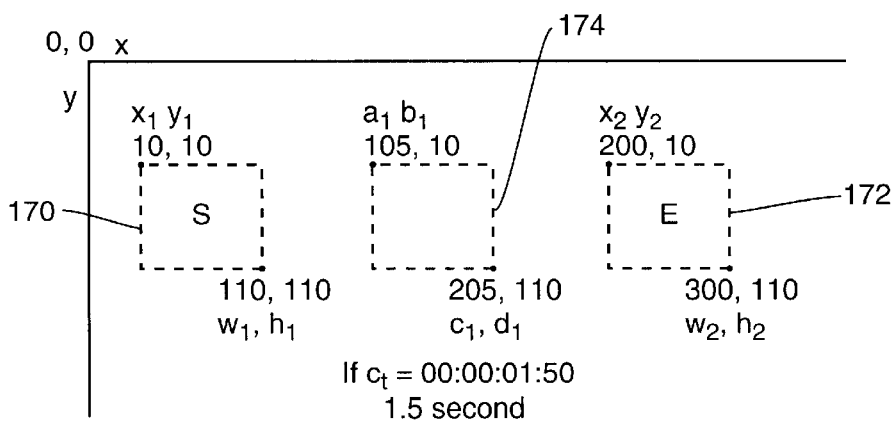
FIG. 2b
Sample Event List 134  154
Start: $t_1 = 00:00:01:00$ at $x_1 = 10$, $y_1 = 10$, $w_1 = 110$, $h_1 = 110$
End : $t_2 = 00:00:02:00$ at $x_2 = 200$, $y_2 = 10$, $w_2 = 300$, $h_2 = 110$
FIG. 2c
$c_t$ = Current Time Code From Video Source (in seconds)
176
$a_1 = x_1 + [(x_2 - x_1)(c_t - (t_2 - t_1))]$    [1]
$b_1 = y_1 + [(y_2 - y_1)(c_t - (t_2 - t_1))]$    [2]
$c_1 = w_1 + [(w_2 - w_1)(c_t - (t_2 - t_1))]$    [3]
$d_1 = h_1 + [(h_2 - h_1)(c_t - (t_2 - t_1))]$    [4]
FIG. 2d 132  Title List  144  146

142—— 00:00:00:00 00:01:12:00 Prologue-Annunciation
148——————c:\Dvd\DVDInteractive\Web-Site\event1.htm
         00:01:12:00 00:01:54:00 Mary visits Elizabeth
               c:\Dvd\DVDInteractive\Web-Site\event2.htm
         00:01:54:00 00:02:48:00 The Birth of Jesus
               http://www.historicjesus.com/3/index.html
         00:02:48:00 00:03:33:00 The Shepherds and the Angels
               http://www.historicjesus.com/4/index.html
         00:03:33:00 00:04:35:00 The Prophecy of Simeon
               http://www.historicjesus.com/5/index.html
         00:04:35:00 00:06:15:00 Jesus with the Teachers in His Fathers House
               http://www.historicjesus.com/6/index.html
         00:06:15:00 00:09:58:00 John the Baptist/Baptism of Jesus
               http://www.historicjesus.com/7/index.html
         00:09:58:00 00:12:10:00 Temptation in the wilderness
               http://www.historicjesus.com/8/index.html
         00:12:10:00 00:15:10:00 Jesus of Nazareth
               http://www.historicjesus.com/9/index.html
         00:15:10:00 00:16:19:00 Jesus at Capernaum
               http://www.historicjesus.com/10/index.html
         00:16:19:00 00:17:12:00 The Pharisee and Tax Collector
               http://www.historicjesus.com/11/index.html
         00:17:12:00 00:19:04:00 Miracle of catching the fish
               http://www.historicjesus.com/12/index.html
         00:19:04:00 00:21:41:00 Raising of Jairus' daughter
               http://www.historicjesus.com/13/index.html
         00:21:41:00 00:22:54:00 Calling of Matthew/Choosing Disciples
               http://www.historicjesus.com/14/index.html
         00:22:54:00 00:24:51:00 Choosing the Apostles
               http://www.historicjesus.com/15/index.html
         00:24:51:00 00:29:35:00 Beatitudes/Sermon on the Mount
               http://www.historicjesus.com/16/index.html
         00:29:35:00 00:32:27:00 In the home of Simon the Pharisee
               http://www.historicjesus.com/17/index.html
         00:32:27:00 00:33:04:00 Jesus teaching
               http://www.historicjesus.com/18/index.html
         00:33:04:00 00:34:55:00 John the Baptist in Prison
               http://www.historicjesus.com/19/index.html
         00:34:55:00 00:37:11:00 Parables
               http://www.historicjesus.com/20/index.html
         00:37:11:00 00:37:45:00 Illusttation of the Lamp
               http://www.historicjesus.com/21/index.html
         00:37:45:00 00:38:00:00 The True Family of Jesus
               http://www.historicjesus.com/22/index.html

FIG. 3

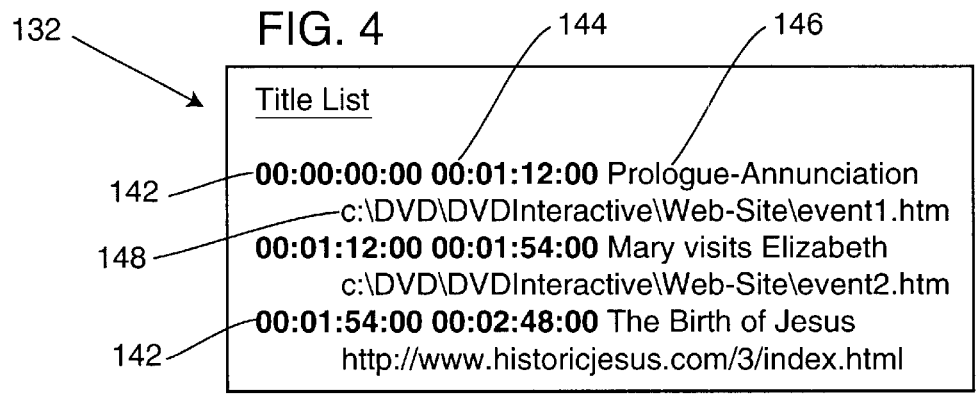
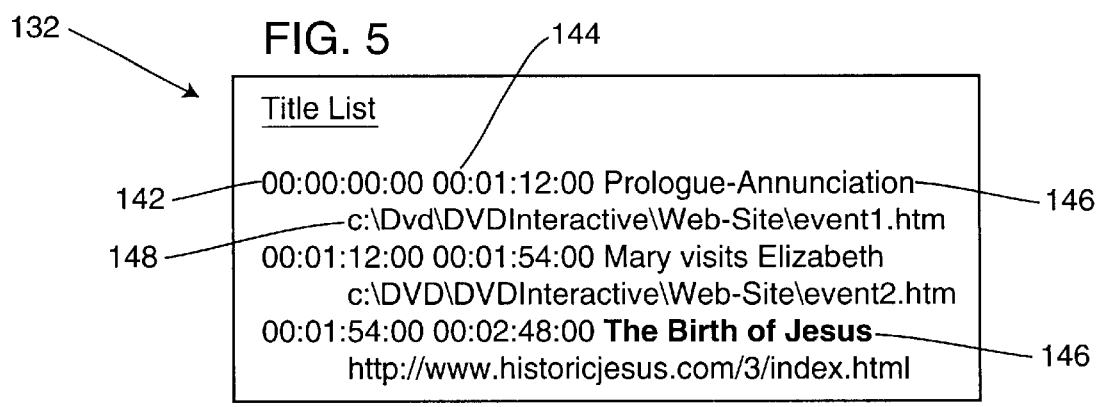
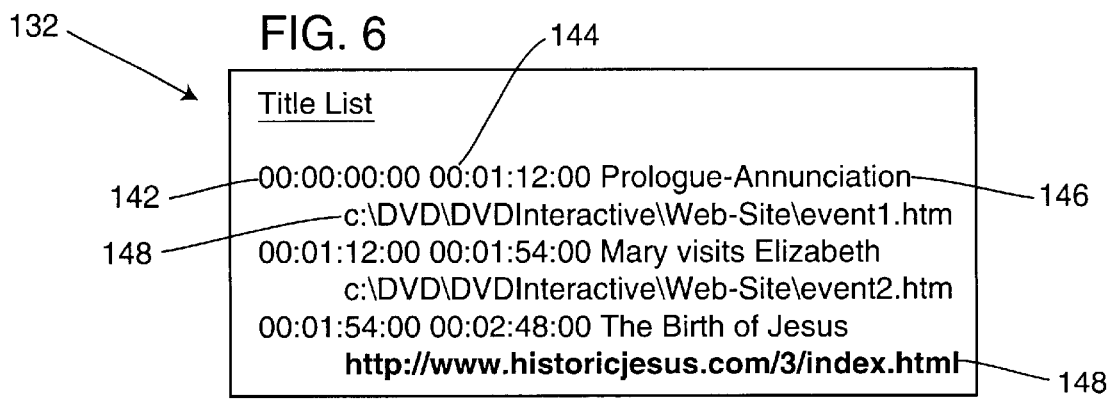

154 — Event List
152 —
150 — S 00:00:12:03 48 203 139 439 Mary, Mother of JESUS — 156
       E 00:00:19:48 425 266 518 397
       S 00:00:20:35 319 254 471 504 Mary, Mother of JESUS
       E 00:00:22:50 327 221 495 549
134 —
       S 00:00:24:48 297 232 389 496 Mary, Mother of JESUS
       E 00:00:25:00 170 245 264 452
       S 00:00:25:01 168 149 212 275 Mary, Mother of JESUS
       E 00:00:35:51 111 136 240 510
150 — S 00:00:25:01 168 149 212 275 Mary, Mother of JESUS
       E 00:00:34:51 111 136 240 510
       S 00:00:36:39 267 233 346 547 Mary, Mother of JESUS
       K 00:00:39:39 471 231 580 544
       K 00:00:42:44 466 240 598 545 Mary, Mother of JESUS
       E 00:00:48:55 140 153 400 550
       S 00:00:59:34 92 136 456 546 Mary, Mother of JESUS
       E 00:01:03:16 80 159 390 550
       S 00:01:11:41 108 155 440 549 Mary, Mother of JESUS
       E 00:01:14:19 88 160 335 551
       S 00:01:15:19 270 239 311 409 Mary, Mother of JESUS
       E 00:01:19:32 250 239 293 410
       S 00:01:22:55 222 234 342 547 Mary, Mother of JESUS
       K 00:01:25:31 293 195 414 550
       E 00:01:30:57 309 178 447 549
       S 00:01:31:43 407 106 637 553 Mary, Mother of JESUS
       E 00:01:37:10 407 106 637 553
       S 00:01:38:09 352 177 585 553 Mary, Mother of JESUS
       E 00:01:45:00 350 176 590 551
       S 00:01:49:43 385 172 632 551 Mary, Mother of JESUS
       E 00:01:54:50 280 168 570 548
       S 00:00:49:20 241 189 467 546 Gabriel — 156
       E 00:00:59:00 241 189 467 546
       S 00:01:03:35 243 189 473 546 Gabriel — 156
       E 00:01:11:10 243 189 473 546
       S 00:01:15:24 311 256 373 438 Joseph
       E 00:01:18:28 288 248 331 401
       S 00:01:20:43 164 288 285 491 Elizabeth, cousin of Mary
       K 00:01:22:41 61 300 219 512
       K 00:01:23:36 144 217 266 550 Elizabeth, cousin of Mary
       K 00:01:26:50 126 178 285 550
       E 00:01:32:08 164 182 312 551
       S 00:01:32:30 13 151 385 541 Elizabeth, cousin of Mary
       E 00:01:38:00 13 151 385 541
       S 00:01:38:38 31 181 320 552 Elizabeth, cousin of Mary
       E 00:01:44:18 96 165 364 552
       S 00:01:44:20 72 137 583 542 Elizabeth, cousin of Mary
       E 00:01:49:00 76 147 594 550
       S 00:01:49:39 8 183 358 549 Elizabeth, cousin of Mary
       E 00:01:54:57 7 177 288 548
       S 00:02:06:23 200 239 277 523 Mary, Mother of JESUS
       E 00:02:11:15 198 239 276 520
       S 00:02:06:23 274 219 375 516 Joseph
       E 00:02:11:15 279 212 362 504
       S 00:02:18:07 308 252 527 550 Joseph
       K 00:02:21:35 205 200 515 551
       E 00:02:24:39 397 197 636 552

FIG. 7

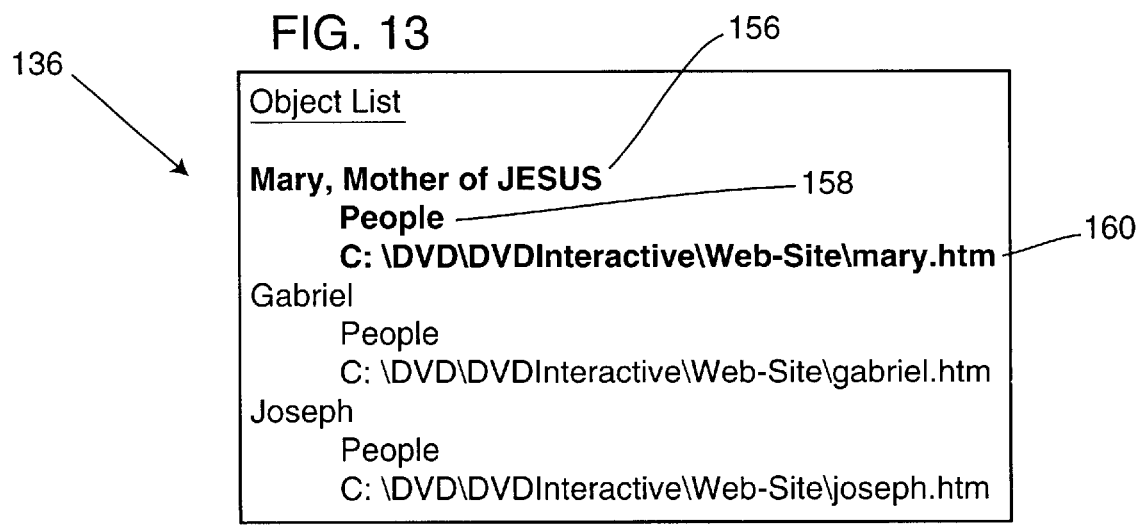
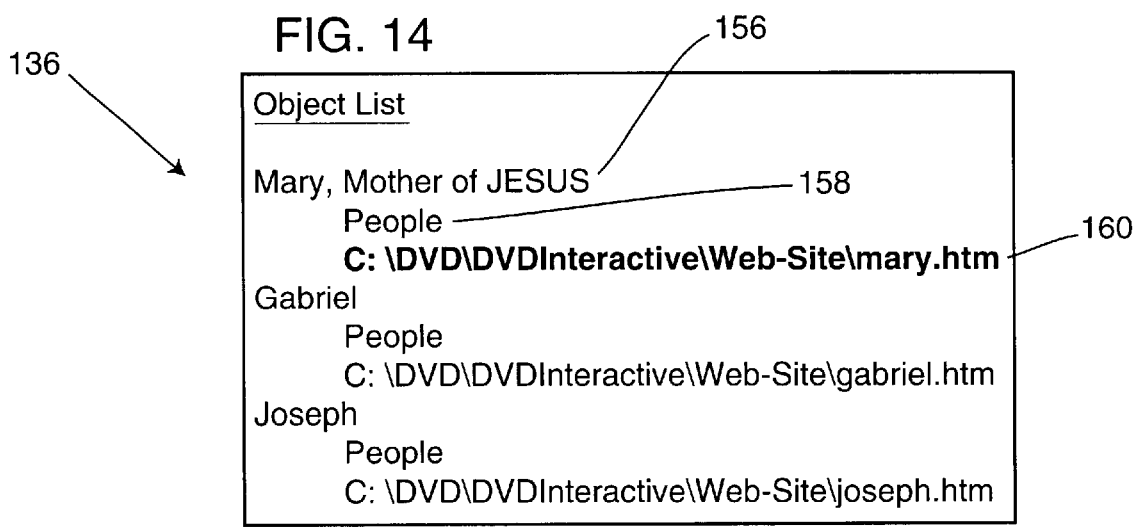

POINTER INTERACTIVE APPARATUS

BACKGROUND OF THE INVENTION

1. Field of the Invention

The present invention relates to pointer interactive devices. More specifically, the present invention relates to methods and apparatus for a pointer interactive device for use with a computing device that utilizes a pointer device in combination with a current time code for identifying a character or object appearing in a video film and displaying information about the character or object on a monitor screen. Alternatively, information from an external source such as a web site or software link and directed to the character or object of interest can be displayed on the monitor screen.

2. Description of the Prior Art

The prior art is directed to methods and apparatus for identifying a character or object appearing in a video film, and obtaining information about the character or object in the video film, or alternatively through another information source directed to the character or object.

It is known in the art to project a video film onto a monitor screen of any one of a plurality of computers, for example, a personal computer, laptop computer or the like. It is also known to include a corresponding audio component to accompany the video film component where the computer is equipped with speakers. Various media is available for serving as a source for the video film including, for example, a Compact Disk Read Only Memory (CD ROM), Video Home System (VHS), Digital Video Disk (DVD), digital video tape, digital video memory source, or analog video tape, which are compatible with the computer.

During the course of the video presentation, it would not be uncommon for a viewer to desire to obtain information about a particular character or object exhibited in the film. In the past, one desiring to obtain information about such a character or object of interest would either have to commit the desire to memory (i.e., make a mental note) or, in the alternative, stop the video presentation and record the desire (i.e., a written note) to perform subsequent research. Under these conditions, the mental note might escape recollection. Additionally, stopping the video presentation to record a written note might be unacceptable if other viewers are present. Either option was not very satisfying since the desired additional information was not immediately accessible.

Even if the mental note was successfully recollected or the written note was sufficiently recorded, the viewer was still required to complete subsequent research. This is the case even if the viewer promptly discontinued the video presentation to seek the desired information. Under any of these situations, typical research tools would be utilized to obtain the desired information. Examples of these research tools might include the use of computer search facilities such as on-line data banks associated with search engines and/or subject specific web sites. This is the case where the character or object of interest is of the type that would normally be cataloged and stored in an electronic data bank.

Other non-computer search facilities such as a reference text, treatise, directory, encyclopedia and the like typically found in a library might also be employed. Another possible situation might be the case where the object of interest viewed in the video film is, for example, sale merchandise. Information concerning sales merchandise would normally be found in printed sales publications and not necessarily in an electronic data bank accessible to the general public. Consequently, substantial research might be necessary in order to discover the desired information concerning the character or object of interest.

Thus, there is a need in the art for a pointer interactive apparatus for use with a computing device that utilizes a pointer device in combination with a current time code associated with a video source for promptly identifying a character or object of interest appearing in the video source, and displaying information to a viewer about the character or object on a monitor screen. Alternatively, information from an external source such as a web site or software link which is directed to the character or object of interest can be displayed on the monitor screen of the computing device where the desired information is accessible without the need for subsequent research.

SUMMARY OF THE INVENTION

Briefly, and in general terms, the present invention provides a new and improved pointer interactive apparatus typically employed with a computing device that utilizes a pointer device in combination with a current time code mechanism associated with a video source for promptly identifying a specific location, i.e., a character or object of interest, appearing in the video source. The pointer interactive apparatus is capable of displaying information about the character or object of interest on a monitor screen by merely hovering the pointer device over the character or object appearing in a video image. Additionally, information from an external source such as a web site or software link which is directed to the character or object of interest can be displayed on the monitor screen of the computing device where the desired information is accessible without the need for subsequent research.

The video source can be comprised of any one of several known video sources including a Compact Disk Read Only Memory (CD ROM), Video Home System (VHS) or Digital Video Disk (DVD) video source, or a digital video tape video source, or a digital video memory video source, or analog video tape video source. A current time code is associated with the video source to provide a time reference to an interpreter mechanism. Thus, the current time code serves to keep track of the particular video image in the video source that currently appears on the monitor screen. A hand operated pointer device such as a computer mouse or other sensor is used to designate a character or object of interest on the video image appearing on the monitor screen. A data storage mechanism is utilized to store data that is specific to the particular video source employed with the inventive pointer interactive apparatus. The data content of the data storage mechanism is compiled for the particular video source during an authoring stage.

When the pointer device is positioned over a specific location on the video image, the current time code assigned to that specific location in combination with coordinate data associated with that current time code (and stored in the data storage mechanism) is utilized to determine the actual coordinates of the pointer device. In addition to the coordinates of the pointer device, the status of the pointer device is also determined, i.e., whether the pointer device is merely hovering over the specific location on the computer image, or whether the pointer device (such as a computer mouse) has been actuated. The video image and the current time code, the coordinates and status of the pointer device, and the stored data within the data storage mechanism are each transmitted to the interpreter mechanism for processing.

When the pointer device is hovering over the specific location of interest on the video image, an output signal from the interpreter mechanism can result in the display of identifying information on the monitor screen. The identifying information appearing on the monitor screen can include (a) a time based title identifying the segment of the video source being viewed, (b) the name of the object over which the pointer device is hovering, and (c) the address or link to an external information source such as a web site. When the pointer device is manually actuated (i.e., such as by clicking one of the two buttons on a computer mouse) over the particular location of interest, the output signal from the interpreter mechanism can result in the linking of the monitor screen to an external information source. The external source typically will include additional information relating to the character or object of interest. For example, the display appearing on the monitor screen relating to the content of the video source will be replaced by the content of a web page, picture, text or other media that includes additional information.

The present invention is generally directed to a pointer interactive apparatus typically utilized with a computing device to identify and track the movement of a character or object of interest appearing in a video image on a monitor screen. In its most fundamental embodiment, the pointer interactive apparatus comprises a construction having a a video source for providing a video image on a monitor screen. A current time code mechanism is associated with the video source for providing a current time code as a time reference on the video source. A pointer device cooperates with the current time code mechanism for identifying a specific location on the video image over which the pointer device is positioned. A data storage mechanism provides stored data for comparing with the current time code and a plurality of input signals from the pointer device. An interpreter is connected to receive the video image including the current time code, the input signals from the pointer device, and the stored data from the data storage mechanism for identifying and tracking the specific location on the video image.

These and other objects and advantages of the present invention will become apparent from the following more detailed description, taken in conjunction with the accompanying drawings which illustrate the invention, by way of example.

BRIEF DESCRIPTION OF THE DRAWINGS

FIG. 2a is an example of a graphical illustration of data from a sample event list of the pointer interactive apparatus of FIG. 1 for use in coordinate verification showing a known starting point and a known ending point of a character or object on a monitor screen including the corresponding coordinates and current time codes.

FIG. 2b is another example of a graphical illustration of data from a sample event list of the pointer interactive apparatus of FIG. 1 showing coordinate verification of a character or object between a known starting point and a known ending point on a monitor screen utilizing the corresponding coordinates and current time codes of the starting and ending points and the current time code of the location of the character or object to determine the coordinates thereof.

FIG. 2c is a sample event list relating to the pointer interactive apparatus of FIG. 1 for use in conjunction with the example graphical illustrations shown in FIG. 2a and FIG. 2b.

FIG. 2d is a list of equations 1–4 that form the algorithm relating to the pointer interactive apparatus of FIG. 1 for use in calculating the coordinates of a character or object positioned between a known stating point and a known ending point on a monitor screen during coordinate verification.

FIG. 3 is a portion of an example Title List residing in a data storage memory of the pointer interactive apparatus of FIG. 1 illustrating a starting and ending time code, time based title, and time based link to another information source extending from a starting time code of 00:00:00:00 to an ending time code of 00:38:00:00.

FIG. 4 is a six line partial listing of the example Title List shown in FIG. 3 of the pointer interactive apparatus of FIG. 1 illustrating a starting and ending time code, time based title, and time based link to another information source extending from a starting time code of 00:00:00:00 to an ending time code of 00:02:48:00 in which portions of lines 1, 3 and 5 are highlighted.

FIG. 5 is the six line partial listing of the example Title List shown in FIG. 4 of the pointer interactive apparatus of FIG. 1 in which a portion of line 5 is highlighted.

FIG. 6 is the six line partial listing of the example Title List shown in FIG. 4 of the pointer interactive apparatus of FIG. 1 in which line 6 is highlighted.

FIG. 7 is a portion of an example Event List of the pointer interactive apparatus of FIG. 1 illustrating a line definer, current time code, upper left and lower right coordinates box definition, and the name of the character or object of interest extending from a starting time code of 00:00:12:03 to an ending time code of 00:02:24:39.

FIG. 13 is a nine line partial listing of the example Object List shown in FIG. 12 of the pointer interactive apparatus of FIG. 1 illustrating the name of the character or object of interest, object category, and an object link to another information source in which lines 1, 2 and 3 are highlighted.

FIG. 14 is the nine line partial listing of the example Object List shown in FIG. 13 of the pointer interactive apparatus of FIG. 1 in which line 3 is highlighted.

DESCRIPTION OF THE INVENTION

Figure 1:
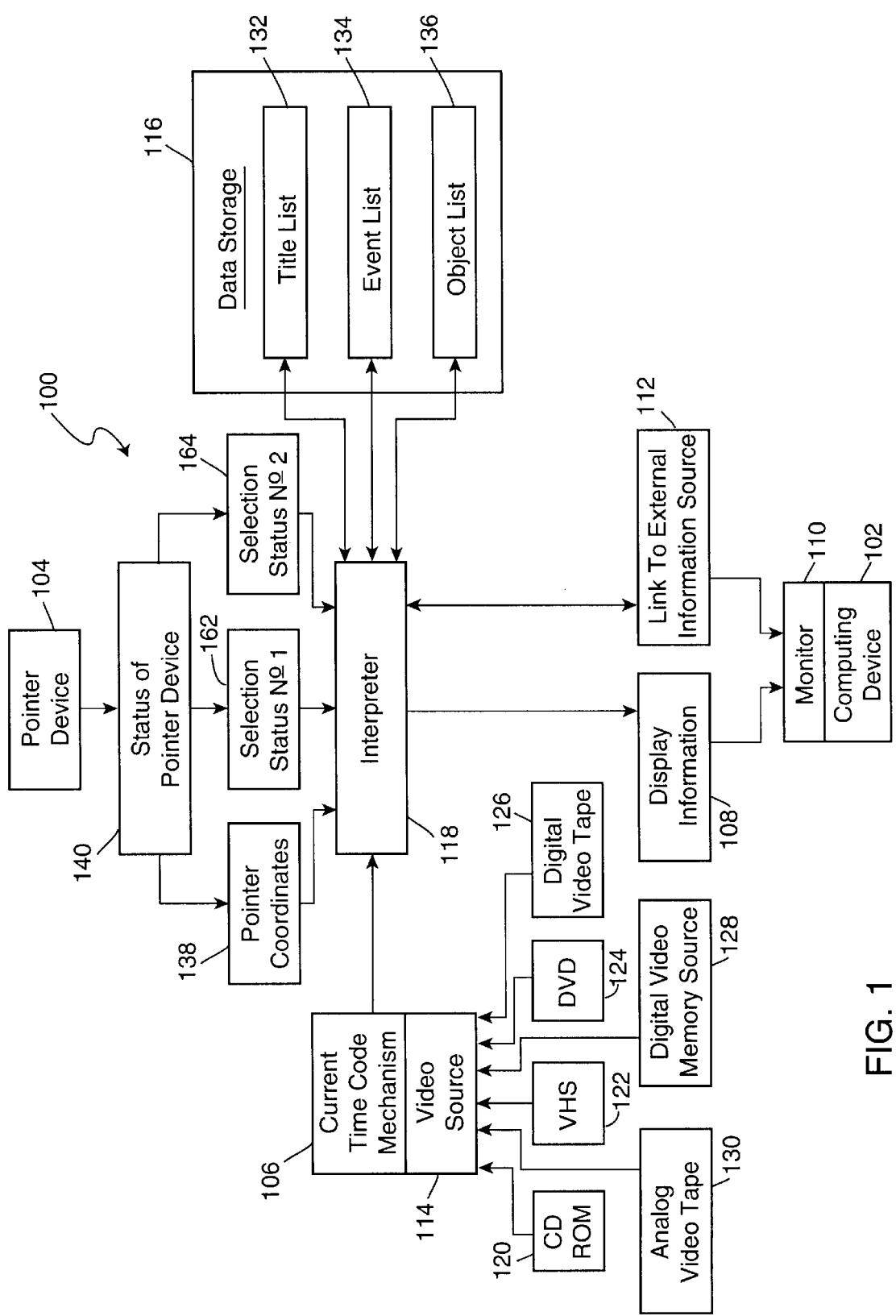
FIG. 1 is a block diagram of the pointer interactive apparatus of the present invention showing the main components including a video source and current time code mechanism, pointer device, data storage memory, and an interpreter mechanism employed to coordinate the digital information and to provide an output on a monitor screen.
Figure 8:
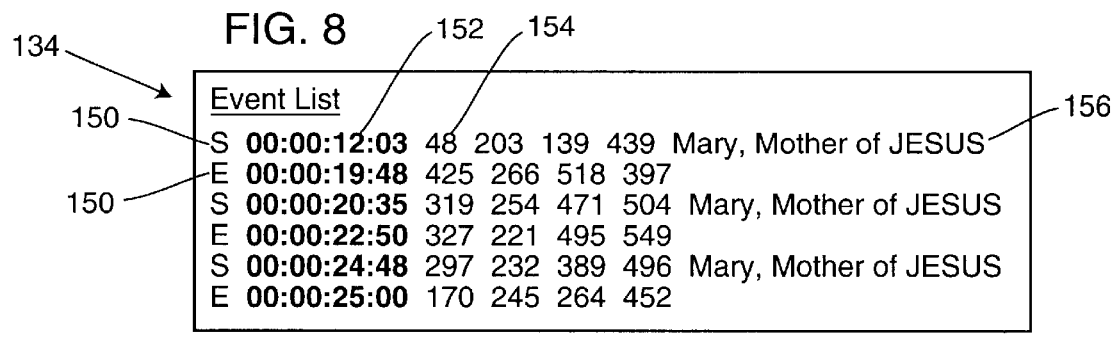
FIG. 8 is a six line partial listing of the example Event List shown in FIG. 7 of the pointer interactive apparatus of FIG. 1 illustrating a line definer, current time code, upper left and lower right coordinates box definition, and the name of the character or object of interest extending from a starting time code of 00:00:12:03 to an ending time code of 00:00:25:00 in which portions of lines 1, 2, 3, 4, 5, and 6 are highlighted.
Figure 9:
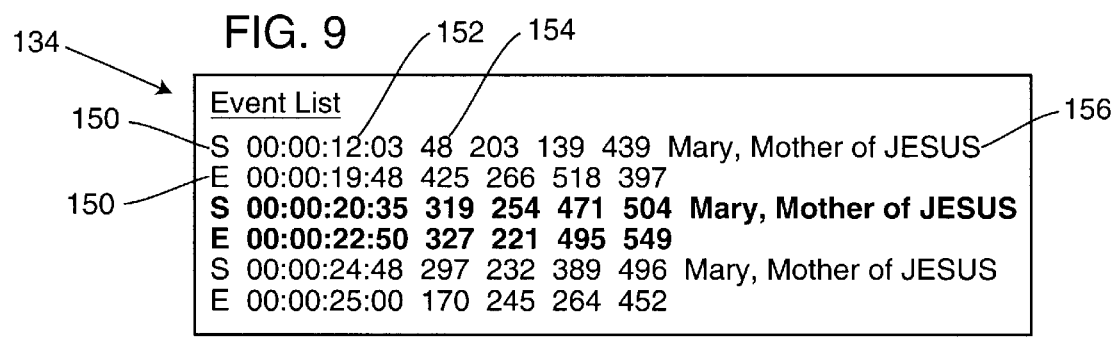
FIG. 9 is the six line partial listing of the example Event List shown in FIG. 8 of the pointer interactive apparatus of FIG. 1 in which lines 3 and 4 are highlighted.
Figure 10:
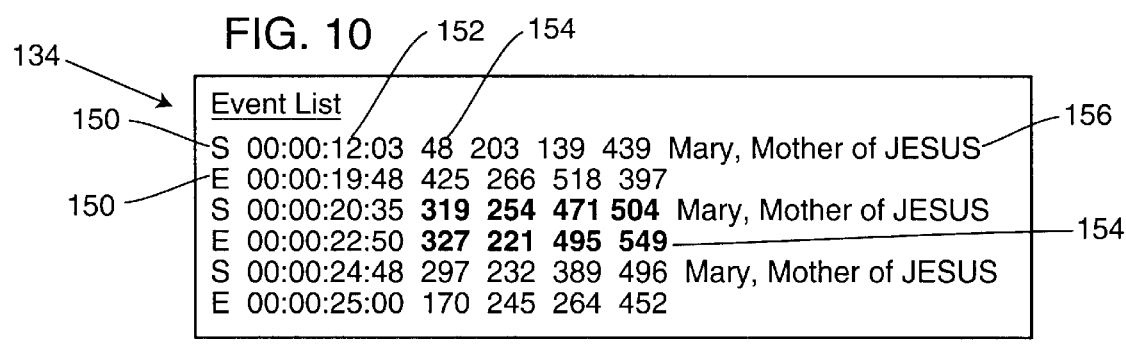
FIG. 10 is the six line partial listing of the example Event List shown in FIG. 8 of the pointer interactive apparatus of FIG. 1 in which a portion of lines 3 and 4 are highlighted.
Figure 11:
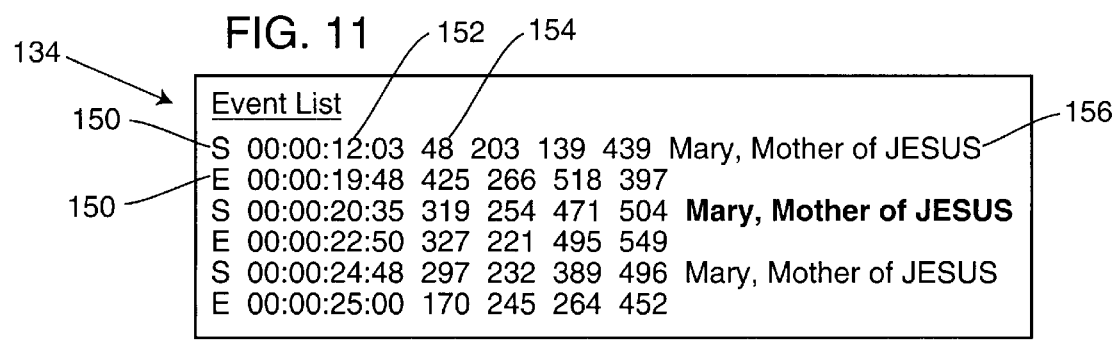
FIG. 11 is the six line partial listing of the example Event List shown in FIG. 8 of the pointer interactive apparatus of FIG. 1 in which a portion of line 3 is highlighted.

The present invention is a pointer interactive apparatus 100 for use with a computing device 102 as shown in FIG. 1. The pointer interactive apparatus 100 employs a pointer device 104 for use in conjunction with a current time code mechanism 106 for identifying and tracking a character or object of interest appearing at a specific location in a video presentation. The pointer interactive apparatus 100 can also display information 108 about the character or object of interest on a monitor screen 110. Alternatively, information from an external source 112 such as a web site or software link and directed to the character or object of interest can be displayed on the monitor screen 110.

In a general overview of a preferred embodiment of the present invention shown in FIG. 1, the pointer interactive apparatus 100 also includes a video source 114 for causing a video image to appear on the monitor screen 110. The current time code mechanism 106 is associated with the video source 114 for assigning a current time code to serve as a time reference on the video source 114. The pointer device 104 is utilized in conjunction with the current time code provided by the current time code mechanism 106 for identifying and tracking the character or object of interest at a specific location on the video image over which the pointer device 104 is positioned. A data storage mechanism 116 (hereinafter data storage 116) is a digital memory device for storing data specific to the video source 114 utilized with the pointer interactive apparatus 100. The data deposited in data storage 116 is utilized to compare with the current time code of the video source 114 and with a plurality of input signals generated by the pointer device 104. An interpreter mechanism 118 (hereinafter interpreter 118) is connected to receive the video image from the video source 114, the current time code from the current time code mechanism 106, the input signals from the pointer device 104, and the stored data from data storage 116. The interpreter 118 utilizes this information to identify and track the character or object of interest located at the specific location on the video image appearing on the monitor screen 110 as will be further described hereinbelow.

The specific structure of the present invention will now be described in more detail. The video image that appears on the monitor screen is provided by the video source 114. Video data can be stored on a plurality of known devices. Thus, the video source 114 can comprise a Compact Disk Read-Only Memory (CD ROM) 120, Video Home System (VHS) 122, Digital Video Disk (DVD) 124, Digital Video Tape 126, Digital Video Memory Source 128, Analog Video Tape 130 or other suitable video source. Each of the above recited examples of the video source 114 are shown in FIG. 1. During the course of the film presentation on a personal computer, various characters, objects and the like appear on the monitor screen 110. It may be of interest to the viewer to obtain information about a character or object appearing at a particular location on the monitor screen 110. In order to satisfy this requirement, a tracking method is utilized to enable the identification of that portion of the film presentation at which the character or object of interest appears. The current time code mechanism 106 serves to provide the necessary tracking feature.

The video source 114 is in signal communication with the current time code mechanism 106. Thus, the video image delivered by the video source 114 to the interpreter 118 includes a time code associated with each frame of the video presentation. The function of the time code generated by the current time code mechanism 106 is to provide a time reference along the entire length of the video presentation. Thus, each frame of video image of the video presentation appearing on the monitor screen 110 includes a time reference. The location of any particular video image in the video presentation is assigned a time reference address measured in hours, minutes, seconds and frames which indicates how much time has passed since the beginning of the video presentation. It is this time coded video presentation that is transmitted from the video source 114 to the interpreter 118. By using this method, any video image appearing in the time coded video presentation can be identified. Additionally, the position of the character or object of interest appearing in the video image can be tracked over the entire length of the video presentation. Likewise, that portion of the video presentation at which the video image appears can be located and identified. This time coding feature in combination with data generated by the pointer device 104 (described hereinbelow) enables a character or object located on the monitor screen 110 to be identified. It is noted that the beginning and ending time codes for various portions of the video presentation are illustrated in the Title List 132 shown in FIGS. 1 and 3 which is present in data storage 116 shown in FIG. 1.

The pointer device 104 utilized with the pointer interactive apparatus 100 typically will comprise a computer mouse but can be any suitable sensor mechanism. Notwithstanding, the pointer device 104 is employed to control a pointer typically present on the monitor screen 110 of the computing device 102 for (a) hovering over (i.e., pointing to), or (b) selecting (i.e., clicking on) the character or object of interest appearing on the video image. When the pointer device 104 is employed to hover over (i.e., point to) a character or object appearing in the video presentation, the character or object is identified at display information 108 on the monitor screen 110 as will be described more fully hereinbelow. Likewise, selecting (i.e., clicking the mouse) while the pointer is positioned over the character or object of interest on the monitor screen 110 is sufficient to pause the film presentation. During this pause, the display information 108 appearing on or transmitted to the monitor screen 110 is linked to an external information source 112 (shown in FIG. 1) for retrieving additional information about the specific location (i.e., location of the character or object of interest) from the external source 112. The external information source 112 can be, for example, a web link such as an Internet web site or a software link external to the pointer interactive apparatus 100.

The function of the pointer device 104 is to identify the coordinate location of the character or object of interest on the monitor screen 110. By combining the pointer device 104 with the current time code mechanism 106, the coordinate location of the character or object (over which the pointer device 104 is hovering) and the time reference data of the character or object can be determined. The current time code data is utilized to keep track of a specific location of the character or object (over which the pointer device 104 is hovering) at any time during the film presentation. This combination of data identifies the exact location of the character or object of interest in the film presentation over which the pointer device 104 is hovering (i.e., pointing to). The approximate coordinate location of the character or object of interest appearing on the monitor screen 110 is identified by comparing the current time code of the character or object with the several charts or lists that are stored in data storage 116. This comparison is accomplished by utilizing the interpreter 118 as shown in FIG. 1. Samples of these lists include: (a) a Title List 132 shown in FIG. 3 with portions of the Title List 132 also shown in FIGS. 4, 5 and 6; an Event List 134 shown in FIG. 7 with portions of the Event List 134 also shown in FIGS. 8, 9, 10 and 11; and an Object List 136 shown in FIG. 12 with portions of the Object List 136 also shown in FIGS. 13 and 14.

A brief discussion of these three lists and their contents will now be presented after which a description of how these lists are employed to determine the approximate coordinate location (and then the exact coordinate location) of the character or object of interest appearing on the monitor screen 110. These coordinates identified on FIG. 1 as pointer coordinates 138 is one of three components generated by the element identified as the Status of Pointer Device 140. The information on the Title List 132, the Event List 134 and the Object List 136 is background data stored in data storage 116 and does not normally appear to the viewer on the monitor screen 110. This background data stored within data storage 116 is compiled during what is known as the authoring stage, i.e., that stage during which the tables or lists are created. It is to be understood that the data stored in the Title List 132, Event List 134 and Object List 136 is subject specific to a particular video presentation. Thus, the authoring data stored in the Title List 132, Event List 134 and Object List 136 for a first video presentation will be different for the authoring data stored in the corresponding lists for a second video presentation. The stored background data in data storage 116 is time based and is related to pointer coordinate location and object identification for a particular video presentation. Therefore, the data stored in data storage 116 can be utilized as a reference for comparing to the current time code (applied along the entire film presentation as a time reference) and to the pointer data of the character or object of interest. This comparison step which is performed by the interpreter 118 provides a preliminary identification and location of the character or object of interest appearing on the monitor screen 110. In other words, the data stored in data storage 116 is unique and is utilized to determine where the pointer device 104 is located in the video presentation.

The Title List 132 shown in FIG. 3 with highlighted portions shown in FIGS. 4, 5 and 6 exhibit two lines of information for a specified first time range. The next two lines exhibit information for a specified second time range, then for the third specified time range, and repeating thereafter for the entire length of the Title List 132 as shown in FIG. 3. The information provided includes a first time code 142 and second time code 144 for specifying a time range, a time based title 146 for the time range specified by the first time code 142 and second time code 144, and a time based link 148 to another (typically external) information source 112 shown in FIG. 1. Referring to the first and second lines of the Title. List 132 of FIG. 3, the first time code 142 is 00:00:00:00 and the second time code 144 is 00:01:12:00 which defines a first time range. The first time range extends for zero hours, one minute, twelve seconds and zero frames. If the current time code assigned by the current time code mechanism 106 to the specific location over which the pointer device 104 is positioned (in the video presentation on the monitor screen 110) falls within this first time range of the stored data in the Title List 132, then the time based title 146 associated with this portion of the film presentation is Prologue-Annunciation as shown in FIGS. 3–6. This is how the Pointer Interactive Apparatus 100 determines which portion of the film presentation the pointer device 104 is hovering over. This time based title 146 (Prologue-Annunciation) is entirely time dependent and along with other information can be displayed (i.e., see Display Information 108 in FIG. 1) at the top of the monitor screen 110. This Display Information 108 is sometimes referred to as an Information Bar which appears to the viewer on the monitor screen 110. If the pointer device 104 is then actuated in a suitable manner (as is described in more detail herein below), the display information 108 is linked to an external information source 112 (i.e., Internet web site or software link external to the pointer interactive apparatus 100) for retrieving additional information about the character or object of interest.

The Event List 134 illustrated in FIG. 7 with highlighted portions shown in FIGS. 8–11 exhibits (a) a line definer code 150, (b) an event time code 152, (c) a coordinates box definition 154, and (d) the name 156 of the character or object appearing on the monitor screen 110 over which the pointer device 104 is hovering. Referring to the first line of the Event List 134 shown in FIG. 7, the first symbol shown (on the left side) is the line definer code 150. The line definer code 150 is either an S, or a K, or an E which indicate a Start, Middle or Ending frame, respectively. It is noted that the first line of the Event List 134 in FIG. 7 includes an S line definer code 150 while the second line includes an E line definer code 150. It is noted that the Start line definer codes 150 and the End line definer codes 150 repeatedly alternate throughout the Event List 134. A K line definer code 150 does not appear until lines twelve and thirteen of the Event List 134. Following each line definer code 150 is a time code 152 for defining the limits of the character or object of interest at the specific time that the pointer device 104 is hovering thereover. Thus, on the first line of the Event List 134 on FIG. 7, the time code 152 indicated by 00:00:12:03 following the S line definer code 150 identifies when the time range commences, thus, the Start time code. Likewise, on the second line of the Event List 134, the time code 152 indicated by 00:00:19:48 following the E line definer code 150 identifies when the time range terminates, thus, the End time code. The Start and End time codes 152 create a time range to which the current time code is compared, where the current time code is the reference time assigned to a particular frame of the film presentation (over which the pointer device 104 is hovering) by the current time code mechanism 106.

Immediately following the time code 152 of the Event List 134 of FIGS. 7–11 is the coordinates box definition 154 which specifies the location of the character or object of interest on the monitor screen 110 at the specific time of the time code 152. The coordinates box definition 154 is comprised of two coordinate pairs which serve to define the locus of a box around the character or object of interest at the specific location on the monitor screen 110. In the Event List 134 shown in FIG. 7, the two coordinate pairs include 48, 203, 139, 439, i.e., [(48, 203) and (139, 439)]. We will now temporarily depart from our discussion of the Event List 134 shown in FIGS. 7–11 and turn our attention to a further example illustrated in FIGS. 2a–2d to clarify how the Event List 134 and the coordinate pairs cooperate.

This further example shown in FIG. 2 may serve to clarify how the Event List 134 cooperates with the coordinate pairs. A sample Event List 134 is shown in FIG. 2c where a Start time code $t_1$=00:00:01:00 at the coordinate pair [($x_1$, $y_1$) and ($w_1$, $h_1$)] where $x_1$=10, $y_1$=10, and $w_1$=110, and $h_1$=110. An End time code $t_2$=00:00:02:00 at the coordinate pair [($x_2$, $y_2$) and ($w_2$, $h_2$)] where $x_2$=200, $y_2$=10 and $w_2$=300 and $h_2$=110. The coordinates in the example data of FIG. 2c set forth in the immediate preceding five lines are treated in the same manner as the coordinate numbers recited in the coordinates box definition 154 shown in FIG. 7.

Reference to FIG. 2a will illustrate how the coordinate pairs recited in the coordinates box definition 154 of FIG. 7 define the locus of a box around the character or object of interest. At the start time code 152 where $t_1$=00:00:01:00 (i.e., one second), the coordinate pair [($x_1$, $y_1$) and ($w_1$, $h_1$,)] illustrating the upper left coordinate ($x_1$, $y_1$) and lower right coordinate ($w_1$, $h_1$) form a first box around the character or object of interest as shown in FIG. 2a. Thus, the coordinates of the first box are $x_1$=10, $y_1$=10, and $w_1$=110, and $h_1$=110 as shown in FIG. 2a. Note that the S printed within the first box is intended to designate the starting time position. At the End time code 152 where $t_2$=00:00:02:00 (i.e., two seconds), the coordinate pair [($x_2$, $y_2$) and ($w_2$, $h_2$)] illustrating the upper left coordinate ($x_2$, $y_2$) and the lower right coordinate ($w_2$, $h_2$) form a second box around the character or object of interest also shown in FIG. 2a. The coordinates of the second box are $x_2$=200, $y_2$=10 and $w_2$=300 and $h_2$=110. Note that the E printed within the second box is intended to designate the ending time position. Thus, the construction of the first box at the Start time code 152 specifies the location of the character or object of interest on the monitor screen 110 at $t_1$=00:00:01:00 (i.e., one second). Likewise, the construction of the second box at the End time code 152 specifies the location of the character or object of interest on the monitor screen 110 at $t_2$=00:00:02:00 (i.e., two seconds).

Referring now to the Event List 134 of FIGS. 7–11, immediately following the coordinates box definition 154 is the name 156 of the character or object of interest over which the pointer device 104 is hovering on the monitor screen 110. The name 156 of the character or object of interest appears in the Event List 134 only after a line that includes a line definer code 150 designated S for start frame. Consequently, the name 156 recorded in the Event List 134 properly identifies the character or object of interest located at the specific location on the video image appearing on the monitor screen 110 only during the specific designated start and end time range. For other time ranges having a designated starting time and ending time, the name 156 recorded in the Event List 134 may be different. For example, line 1 of the Event List 134 shown in FIG. 7 and in FIGS. 8–11 includes an S line definer code 150. Thus, the name 156 of the character or object of interest appearing on the monitor screen 110 over which the pointer device 104 is hovering is recorded in the Event List 134 as Mary, Mother of JESUS. The second line of the Event List 134 shown in FIG. 7 and in FIGS. 8–11 includes an E line definer code 150 and thus a name 156 of a character or object of interest is not recorded in the Event List 134.

Figure 12:
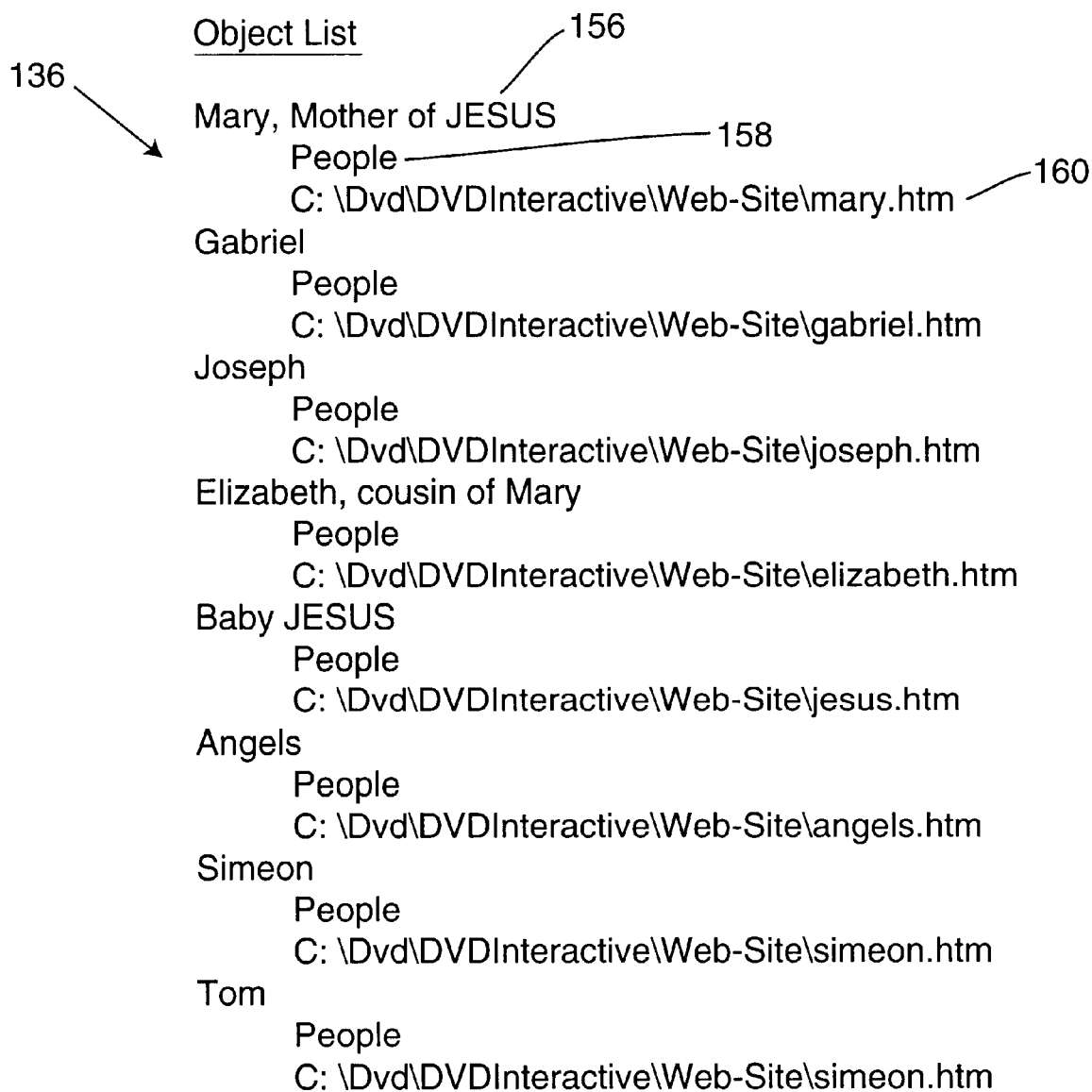
FIG. 12 is an example Object List of the pointer interactive apparatus of FIG. 1 illustrating the name of the character or object of interest, object category, and an object link to another information source directed to the character or object.

The Object List 136 illustrated in FIG. 12 with highlighted portions shown in FIGS. 13–14 exhibits (a) the name 156 of the character or object of interest over which the pointer device 104 is hovering (i.e., the name 156 shown in the Event List 134), (b) an object category 158 typically comprising a person, place or thing, and (c) an object link 160 which is a reference to another or external information source. The Object List 136 is directed to specific characters or objects appearing in the film presentation having names 156 such as Mary, Gabriel, Joseph, Elizabeth or an object or film prop. The object category 158 is then identified as a person, place or thing. Use of the object link 160 enables the display information 108 appearing on or transmitted to the monitor screen 110 to be linked to an external information source 112 (shown in FIG. 1) for retrieving additional information about the specific location (i.e., location of the character or object of interest) from the external source 112.

The external information source 112 can be, for example, a web link such as an Internet web site, a software link, or other portion of a program which changes the interactive feature experience. Referring to FIGS. 12–14, line 1 recites the name 156 of the character or object over which the pointer device 104 is hovering (i.e., Mary, Mother of JESUS). Line 2 of FIG. 12 recites the object category 158 as People, and line 3 recites an object link 160 which in this case appears to be a reference to a web page located on a hard drive of a computing device 102 as shown in FIG. 1.

It is emphasized that each of the above identified lists, i.e., the Title List 132, Event List 134 and Object List 136, are compiled during the authoring stage of the design of the Pointer Interactive Apparatus 100. It is further emphasized that these three lists are interrelated and each is employed in conjunction with the others in order to accomplish the primary goal, i.e., to identify and track the character or object of interest at a specific location on the monitor screen 110 over which the pointing device 104 is hovering. In general, each of the lists has a specific function. When the current time code of the film presentation (generated by the current time code mechanism 106) falls between the first time code 142 and the second time code 144 of the Title List 132 shown in FIG. 3, the location of the portion of the film presentation over which the pointer device 104 is hovering can be identified. Further, a time based link 148 is also provided. Additionally, when the current time code of the film presentation falls within the time range beginning with a Start line definer code 150 and terminating with an End line definer code 150 of the Event List 134, the coordinates box definition 154 is utilized to determine the approximate coordinates of the character or object at the specific location on the monitor screen 110 over which the pointer device 104 is hovering. The exact coordinates of the character or object can be determined by utilizing the algorithmic equations 1–4 presented hereinbelow in a procedure known as coordinate verification. Further, the name 156 of the character or object appearing in the Event List 134 serves to provide a reference into the Object List 136 (which also recites the name 156 as highlighted, i.e., bolded in FIG. 13). Additionally, the object category 158 and the object link 160 to another or external information source 112 is also provided.

During the operation of the computing device 102 such as, for example, a lap top computer, highlighted information will appear on the monitor screen 110 from the interpreter 118 via display information 108 as shown in FIG. 1. The display information 108 highlights and displays the information on a portion of the monitor screen 110 normally referred to as an information bar. The information displayed on the information bar is directly related to the character or object over which the pointer device 104 is hovering. Consequently, when the pointer device 104 is moved from one person, character or object to another, the highlighted information appearing on the information bar (display information 108) varies. There are several items of display information 108 that can appear on the information bar either as an icon, graphic (still or animated), and/or as text description. A first item identifies the segment of the time based title 146 which is controlled by the current time code of the video source 114 as shown in FIG. 1. This time dependent information is available from the Title List 132 shown in FIG. 3. If the current time code from the video source 114 falls within the range between the first time code 142 and the second time code 144 as shown (for example, on line 1 in FIG. 3, and highlighted on line 1 in FIG. 4) the time based title 146 of that portion of the film presentation will appear on the first line of the information bar (display information 108) on the monitor screen 110. Further, if the pointer device 104 is properly actuated on the first line of the information bar, then the interpreter 118 causes the display information 108 appearing on the monitor screen 110 to display information 108 from an external information source 112 for retrieving additional information of interest appearing on the monitor screen 110.

A second item of display information 108 that can appear on the information bar is the name of the character or object appearing on the monitor screen 110 over which the pointer device 104 is hovering. The name of the character or object of interest can be determined by utilizing the Event List 134. Once the section of the film presentation over which the pointer device 104 is hovering is known from the Title List 132, the interpreter 118 then compares the current time code of the pointer coordinates with the time code data and the coordinate data of the Event List 134. If the current time code of the video source 114 falls within the time range designated by the Start and End time codes 152 of the Event List 134, the interpreter 118 verifies the coordinates of the pointer device 104 on the monitor screen 110 with the coordinates listed in the Event List 134 using the method known as coordinate verification illustrated in FIGS. 2a–2d as described herein. If the coordinates listed in the Event List 134 are therefore verified to include the coordinates of the pointer device 104, then the name 156 of the character or object of interest is displayed on the information bar (display information 108) on the monitor screen 110. Thus, if the pointer device 104 is hovering over the character or object on the monitor screen 110, and the Starting and Ending time codes 152 match with those recorded in the Event List 134, then the name 156 of the character or object is displayed on the monitor screen 110.

A third item of display information 108 that can appear on the information bar is the object link 160 to another or external information source 112 shown in FIG. 1. The name 156 of the character or object located at the specific location on the monitor screen 110 during the specific time period and at the coordinates of the character or object obtained from the Event List 134 is employed as a reference into the Object List 136 as shown in FIG. 12. The name 156 of the character or object is then discovered in the Object List 136 of data storage 116. The name 156 stored in the Object List 136 leads to the object link 160 which is a link to another or external information source 112 as shown in FIG. 1. By actuating the pointer device 104 in a suitable manner on the character or object of interest, a link to the external information source 112 can be made, as well as use of the information located at the address of the object link 160.

The pointer device 104 is typically implemented as a mouse or other sensor device. In FIG. 1, the pointer device 104 is shown as communicating with a box labeled status of pointer device 140. A signal delivered to the box labeled status of point device 140 by the pointer device 104 is intended to assist the Pointer Interactive Apparatus 100 to determine the particulars of the pointer device 104 and to deliver that information to the interpreter 118. The output signal from the box entitled status of pointer device 140 is in communication with (a) a box labeled pointer coordinates 138, (b) a box labeled No. 1 selection status 162, and (c) a box labeled No. 2 selection status 164. The output of each of these boxes is directed to the interpreter 118 as shown in FIG. 1. The operation of the pointer device 104 always provides the interpreter 118 with (a) the pointer coordinates 138 of the pointer device 104 (i.e., mouse pointer horizontal and vertical coordinates), typically a user defined character or object of interest at the specific location on the monitor screen 110 over which the pointer device 104 is hovering, and (b) the status of the keys or buttons on the pointer device 104.

Once the pointer device 104 is positioned over the character or object of interest, it can remain in the hovering state, or the pointer device 104 can be actuated (i.e., clicked). The box entitled pointer coordinates 138 represents the condition where the pointer device 104 hovers over the character or object of interest. The pointer coordinates 138 of the character or object of interest are provided to the interpreter 118 by comparing the current time code of the video source 114 to the Starting and Ending time codes 152 in the Event List 134 to determine what segment of the video source 114 is shown on the monitor screen 110. Then, the interpreter 118 compares the current time code of the video source 114 over which the pointer device 104 is hovering to the time code data and coordinate data stored in the Event List 134 using the coordinate verification method as illustrated in FIGS. 2a–2d. Each match between the current time code and the data stored in the Title List 132 and/or Event List 134 using the coordinate verification method results in displaying data (display information 108) from the interpreter 118 onto the information bar on the monitor screen 110. Once a match exists between the current time code of the video source 114 and the time code data and coordinate data of the Event List 134 using the coordinate verification method, the name 156 of the character or object is referenced to the object list 136 so that the link to another or external information source 112 can be made.

The status of the keys or buttons on the pointer device 104 is intended to indicate when the pointer device 104 is actuated or clicked. As is well known in the art, the pointer device 104 often includes two keys or buttons (not shown). In the present invention, the two keys or buttons function as switches which are in electrical communication with the interpreter 118. Thus, the No. 1 selection status 162 as shown in FIG. 1 represents button #1 (i.e., the left mouse button) on the pointer device 104 and is associated with the Event List 134. The No. 1 selection status 162 refers the interpreter 118 to the Object Link 160 located on the third line of the Object List 136 (which is linked from or referenced from the Event List 134 via the name 156 of the character or object of interest). The No. 2 selection status 164 as shown in FIG. 1 represents button #2 (i.e., the right mouse button) on the pointer device 104 and is associated with the Title List 132. The No. 2 selection status 164 refers the interpreter 118 to the Time Based Link 148 which is located on the second line of the Title List 132.

As a result of this design, the Status of Pointer Device 140 can be immediately sent to the interpreter 118. If the pointer device 104 is not actuated (i.e., not clicked), then the pointer device 104 is hovering and the coordinates of the character or object of interest are provided to the interpreter 118 by pointer coordinates 138. If the pointer device 104 is actuated or clicked on either No. 1 selection status 162 or No. 2 selection status 164, the interpreter 118 then relinquishes control to another media device or application (not shown) outside or external to the interpreter 118. The media device (not shown) may exhibit the other or external information source (referenced in the Title List 132 and the Object List 136) on the monitor screen 110, or, in the alternative, record certain information on another media. For example, if the pointer device 104 is actuated or clicked on the Title line (representing the time based title 146, i.e., Prologue-Annunciation) of the information bar (i.e., display information 108), the interpreter 118 is linked to the time based link 148 of the Title List 132 (i.e., c:\Dvd\DVDInteractive\Web- Site\event1.htm). It is the location of the pointer device 104 on the monitor screen 110 that provides direction to the interpreter 118. Any number of other or external information sources could be available and/or displayed on the monitor screen 110 including links to an Internet web page(s), picture(s), text(s) or other media. The link to another or external information source 112 is shown in FIG. 1. In order to distinguish between the link to another or external information source 112 associated with the Title List 132 and the link to another or external information source 112 associated with the Event List 134, button #2 (i.e., No. 2 selection status 164 on FIG. 1; the right mouse button) is employed to connect the interpreter 118 to the Title List 132. Likewise, button #1 (i.e., No. 1 selection status 162 on FIG. 1; the left mouse button) is employed to connect the interpreter 118 to the Event List 134.

The interpreter 118 is the central component of the Pointer Interactive Apparatus 100 as shown in FIG. 1. The interpreter 118 receives input signals from: (a) the current time code mechanism 106 which provides the timed based data (i.e., time coded video signals) from the video source 114; (b) pointer coordinate data from the Status of Pointer Device 140 including pointer coordinates 138, No. 1 selection status 162, and No. 2 selection status 164; and (c) data storage 116 including Title List 132, Event List 134 and Object List 136. The interpreter 118 is an encapsulation of logic and can be implemented in several different ways. One method of implementing the interpreter 118 is by utilizing computer software. However, the interpreter 118 can also be manifested as hardware in a Read Only Memory (not shown) as an alternative. In either implementation, the interpreter 118 utilizes the combined information from the current time code mechanism 106 and the pointer coordinate data from the status of pointer device 140, in combination with the information from data storage 116 to logically determine what to display on the monitor screen 110 or other display output device. When implemented as software, the interpreter 118 determines (1) whether the pointer device 104 is hovering over the character or object of interest as defined by the Starting and Ending time codes 152 of the Event List 134, (2) the coordinates of the character or object of interest as listed in the Event List 134, and (3) the current time code from the current time code mechanism 106 and the video source 114.

FIG. 2 is an example of Coordinate Verification intended to represent the mathematical exercise necessary for the interpreter 118 to complete in order to calculate the actual location of the character or object located at the specific location on the monitor screen 110. Coordinate Verification enables the Pointer Interactive Apparatus 100 to determine where on the monitor screen 110 the interpreter 118 should look to discover the actual pointer coordinates when the current time code from the video source 114 does not exactly match the time coded data stored in the Event List 134. In order for the interpreter 118 to perform these mathematical calculations, a processor (not shown) is required. Consequently, the interpreter 118 includes a processor (not shown) capable of performing the necessary calculations as will be described in an example set forth hereinbelow. The calculations are intended to determine the correct coordinates of where to look for the character or object that appears on the monitor screen 110 over which the pointer device 104 is positioned.

We now turn to FIG. 2 which illustrates the Coordinates Verification procedure with reference to FIG. 2c. The pointer coordinate data set forth in the sample Event List 134 in FIG. 2c includes a Start time code 152 of $t_1$=00:00:01:00 having the coordinate pairs [($x_1$, $y_1$) and ($w_1$, $h_1$)] where $x_1$=10, $y_1$=10, and $w_1$=110, and $h_1$=110. An End time code 152 of $t_2$=00:00:02:00 includes the coordinate pairs [($x_2$, $y_2$) and ($w_2$, $h_2$)] where $x_2$=200, $y_2$=10 and $w_2$=300 and $h_2$=110. We will now return to FIG. 2a to continue the example initially discussed on page 17 of this Description of the Invention. FIG. 2a illustrates how the coordinate pairs recited in the coordinates box definition 154 of FIG. 2c define the locus of a box around the character or object of interest. At the start time code 152 where $t_1$=00:00:01:00 (i.e., one second), the coordinate pair [($x_1$, $y_1$) and ($w_1$, $h_1$)] illustrating the upper left coordinate ($x_1$, $y_1$) and lower right coordinate ($w_1$, $h_1$) form a first box 170 around the character or object of interest as shown in FIG. 2a. Thus, the coordinates of the first box 170 are $x_1$=10, $y_1$=10, and $w_1$=110, and $h_1$=110 as shown in FIG. 2a. Note that the S printed within the first box 170 is intended to designate the starting time position.

At the End time code 152 where $t_2$=00:00:02:00 (i.e., two seconds), the coordinate pair [($x_2$, $y_2$) and ($w_2$, $h_2$)] illustrating the upper left coordinate ($x_2$, $y_2$) and the lower right coordinate ($w_2$, $h_2$) form a second box 172 around the character or object of interest also shown in FIG. 2a. The coordinates of the second box 172 are $x_2$=200, $y_2$=10 and $w_2$=300 and $h_2$=110. Note that the E printed within the second box 172 is intended to designate the ending time position. Thus, the construction of the first box 170 at the Start time code 152 specifies the location of the character or object of interest on the monitor screen 110 at $t_1$=00:00:01:00 (i.e., one second). Likewise, the construction of the second box 172 at the End time code 152 specifies the location of the character or object of interest on the monitor screen 110 at $t_2$=00:00:02:00 (i.e., two seconds). FIG. 2a illustrates the extremes of the Start and End time codes 152 where $t_1$=00:00:01:00 (i.e., one second) and $t_2$=00:00:02:00 (i.e., two seconds). If the current time code of the video source 114 is different from the Start and End time codes 152 listed in the sample Event List 134 of FIG. 2c, then the actual coordinates of the pointer device 104 are not the same as those stored in the sample Event List 134 of FIG. 2c but somewhere in-between. In order to determine the actual pointer coordinates on the monitor screen 110 over which the pointer device 104 is hovering, reference must be made to FIG. 2b.

FIG. 2b illustrates the coordinate verification procedure that is employed to determine the actual pointer coordinates at the specific location on the video image on the monitor ;screen 110 over which the pointer device 104 is hovering. A third box 174 is shown in FIG. 2b which is intended to illustrate or define the locus of points around the character or object of interest based upon the current time code of 1.5 seconds at the actual pointer coordinates. The first, second and third boxes 170, 172, 174, respectively, shown in FIG. 2b are utilized by the interpreter 118 for calculating the probable location of the pointer device 104. The first, second and third boxes 170, 172 and 174 are also utilized for determining if the pointer device 104 is hovering or has been actuated (i.e., clicked) in this predefined region that employs the sample data from the Event List 134 shown in FIG. 2c. The third box 174 illustrates a current time code $c_t$=00:00:01:05 (i.e., one and one-half seconds into the film presentation) which defines the area on the video image where it is most likely that the character or object of interest (such as Mary, Mother of JESUS) will be found.

The upper left and lower right coordinates shown on box 170 and box 172 are the same coordinates as described in FIG. 2a and are derived from the Event List 134. The upper left and lower right coordinates of the third box 174 must be calculated from a plurality algorithmic equations 1–4 represented by the number 176 as shown in FIG. 2d. The calculated coordinates represent the prospective location of the character or object of interest on the monitor screen 110 as compared to those precalculated coordinates stored in the Event List 134 during the authoring stage. This coordinate verification procedure indicates where the actual coordinates of the character or object of interest are positioned on the monitor screen 110. The algorithmic equations 176 shown in FIG. 2d are repeated immediately below for the convenience of calculating the upper left and lower right coordinates of the third box 174 shown in FIG. 2b. If the upper left coordinate and the lower right coordinate of the third box 174 enclosing the character or object of interest are defined as $[(a_1, b_1)$ and $(c_1, d_1)]$, respectively, the equations are as follows.

$$a_1 = x_1 + [(x_2-x_1)(c_t-(t_2-t_1))] \quad [1]$$

$$b_1 = y_1 + [(y_2-y_1)(c_t-(t_2-t_1))] \quad [2]$$

$$c_1 = w_1 + [(w_2-w_1)(c_t-(t_2-t_1))] \quad [3]$$

$$d_1 = h_1 + [(h_2-h_1)(c_t-(t_2-t_1))] \quad [4]$$

In FIG. 2b, a known starting point and a known ending point appearing on the monitor screen 110 are illustrated. The (1) coordinates of the starting point $[(x_1, y_1), (w_1, h_1)]$ and the ending point $[(x_2, y_2), (w_2, h_2)]$, (2) the corresponding current time codes of the starting point $(t_1)$ and the ending point $(t_2)$, and (3) the current time code $(c_t)$ of the character or object of interest appearing on the monitor screen 110 between the starting point and the ending point are utilized to determine the corresponding coordinates $[(a_1, b_1), (c_1, d_1)]$ of the character or object of interest. By using the algorithmic equations 176 set out above (and also in FIG. 2d) in conjunction with the data set forth in the sample Event List 134 appearing in FIG. 2c, the following coordinates $(a_1, b_1)$ and $(c_1, d_1)$ can be calculated.

$$a_1 = x_1 + [(x_2-x_1)(c_t-(t_2-t_1))] \quad [1]$$

$$a_1 = 10 + [(200-10)(1.5-(2-1))] = 105$$

$$a_1 = 105$$

$$b_1 = y_1 + [(y_2-y_1)(c_t-(t_2-t_1))] \quad [2]$$

$$b_1 = 10 + [(10-10)(1.5-(2-1))] = 10$$

$$b_1 = 10$$

$$c_1 = w_1 + [(w_2-w_1)(c_t-(t_2-t_1))] \quad [3]$$

$$c_1 = 110 + [(300-110)(1.5-(2-1))]$$

$$c_1 = 205$$

$$d_1 = h_1 + [(h_2-h_1)(c_t-(t_2-t_1))] \quad [4]$$

$$d_1 = 110 + [(110-110)(1.5-(2-1))]$$

$$d_1 = 110$$

These coordinates [i.e., (a1, b1)=(105, 10) and (c1, d1)= (205, 110)] of the character or object of interest appearing on the monitor screen 110 at the current time code of $c_t = 00:00:01:05$ (one and one-half seconds into the film presentation) have been calculated by the coordinate verification procedure disclosed herein and are clearly illustrated in FIG. 2b. These coordinates can then be utilized to determine the name 156 of the character or object of interest in the Event List 134 shown in FIG. 7. The name 156 in the Event List 134 can then be used as a reference into the Object List 136 shown in FIG. 12 to determine the Object Link 160 to another and external information source 112 as shown in FIG. 1.

Figure 15:
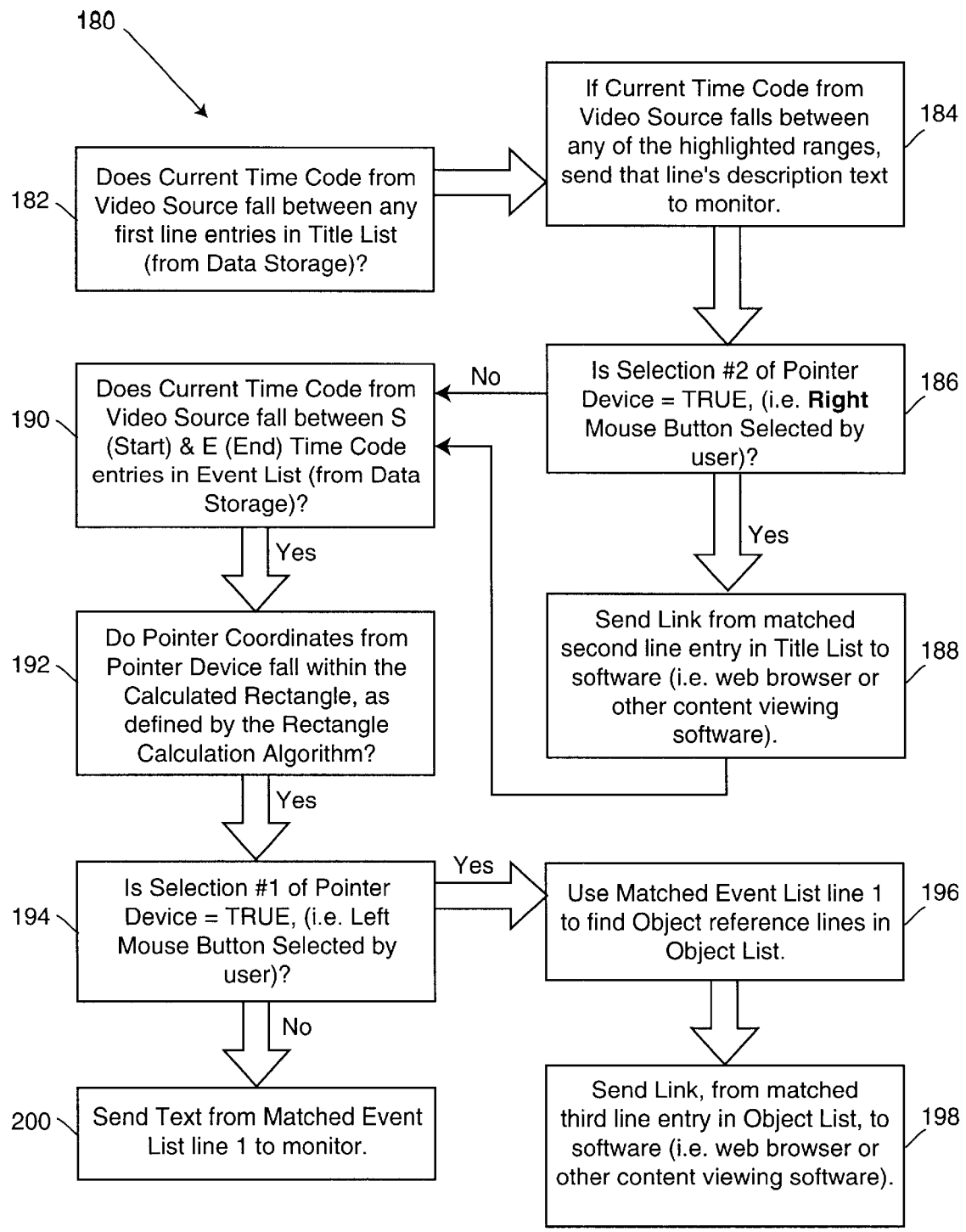
FIG. 15 is a flow diagram illustrating the logical sequence of steps of the interpreter mechanism in identifying and tracking the movement of a character or object of interest appearing in a video image on the monitor screen.

A flow diagram 180 is shown in FIG. 15 which illustrates the operation of the Pointer Interactive Apparatus 100. The flow diagram 180 begins with a box labeled 182. Box 182 sets forth the question and asks whether the current time code from the video source 114 shown on FIG. 1 falls between any first line entries in the Title List 132 which is located in data storage 116. Reference should be made to the first time code 142 and the second time code 144 of the Title List 132 shown in FIG. 4. There are three highlighted first line entries (i.e., lines 1, 3, 5) appearing in FIG. 4 and each includes a first time code 142 and a second time code 144. The question set forth in box 182 applies to each of the three highlighted first line entries appearing in FIG. 4. If a current time code from the video source 114 does fall within one of the highlighted first line entries in FIG. 4, the flow diagram 180 proceeds to a box 184. Box 184 states that if the current time code from the video source 114 falls between any of the highlighted first line entry time ranges in FIG. 4, the interpreter 118 is to send the descriptive text of that time based title 146 to the monitor screen 110. For example, if the current time code $c_t = 00:02:01:03$ which is shown in the highlighted portion of line 5 of FIG. 4 and in line 5 of FIG. 5, then the highlighted text on line 5 in FIG. 5 (i.e., The Birth of Jesus) is actually sent to the monitor screen 110 for display on the information bar (display information 108). After the highlighted text shown on line 5 of FIG. 5 has been sent to the monitor screen 110, the flow diagram 180 then proceeds to a box 186 as shown in FIG. 15.

Box 186 sets forth the question and asks whether the No. 2 selection status 164 of the pointer device 104 shown on FIG. 1 is equal to TRUE. The question being asked is whether the button #2 (i.e., the right mouse button) of the pointer device 104 has been selected, i.e., actuated or clicked. The button #2 (i.e., the right mouse button) of the pointer device 104 is associated with the Title List 132 and the time based link 148 as shown in FIGS. 3–6. If the No. 2 selection status 164 is TRUE (i.e., the right mouse button of the pointer device 104 has been clicked), then the answer to the question in Box 186 is yes and the flow diagram 180 proceeds to a box 188. Box 188 states that if button #2 (i.e., the right mouse button) has been clicked, then the interpreter 118 is to send the time based link 148 from the matched highlighted second line entry appearing on line 6 of FIG. 6 to software associated with another or external information source 112. This software can be, for example, a web browser or other content viewing software (not shown). To further illustrate, if the current time code from the video source 114 is $c_t = 00:02:01:03$ and button #2 (i.e., the right mouse button) has been clicked, then the highlighted second line entry appearing on line 6 of FIG. 6 is sent to an associated web browser.

If the No. 2 selection status 164 is equal to FALSE (i.e., the Right mouse button of the pointer device 104 has not been actuated or clicked), then the answer to the question in Box 186 is No and the flow diagram 180 proceeds to a Box 190. Box 190 can also be reached from Box 188 after the instruction issued in Box 188 has been completed (i.e., after the interpreter 118 has sent the highlighted time based link 148 from line 6 of the Title List 132 of FIG. 6 to the web browser software). Box 190 sets forth another question and asks whether the current time code from the video source 114 falls between the entries of the Start and End time codes 152 in the Event List 134 located in data storage 116? This question refers to the Event Lists 134 shown in FIGS. 7–11 and particularly to FIG. 8. Partially highlighted lines 1–6 of FIG. 8 clearly indicate the Start and End time codes 152 of the Event List 134. In an example, if the current time code from the video source 114 is $c_f$=00:00:21:03, then the highlighted lines 3–4 of FIG. 9 reciting the coordinates box definition 154 would be utilized in further calculations. The flow diagram 180 then proceeds to Box 192 which sets forth another question and asks whether the pointer coordinates from the pointer device 104 fall within the calculated rectangular third box 174 shown in FIG. 2b defined by the rectangular calculation algorithmic equations 176 of the coordinate verification method shown in FIG. 2d. In the example where the current time code from the video source 114 is $c_t$=00:00:21:03, the highlighted coordinates box definition 154 on lines 3 and 4 of FIG. 10 would be utilized in the rectangular calculation algorithmic equations 176 to determine the pointer coordinates at the current time code. If the pointer coordinates from the pointer device 104 do fall within the calculated rectangular third box 174, then the flow diagram 180 proceeds to a Box 194.

The Box 194 sets forth another question and asks whether No. 1 selection status 162 (i.e., button #1) of the pointer device 104 shown in FIG. 1 is equal to TRUE (i.e., whether the left mouse button of the pointer device 104 has been selected, activated or clicked). Button #1 (i.e., the left mouse button) of the pointer device 104 is associated with the Event List 134, the Object List 136 and the Object Link 160 as shown in FIGS. 12–14. If the No. 1 selection status 162 is TRUE (i.e., the Left mouse button of the pointer device 104 has been clicked), then the answer to the question in Box 194 is yes and the flow diagram 180 proceeds to a Box 196. Box 196 states that if button #1 (i.e, No. 1 Selection Status 162; left mouse button) has been clicked, then the matched highlighted name 156 of the character or object of interest appearing on line 3 of FIG. 11 of the Event List 134 (i.e., Mary, Mother of JESUS) is utilized as a reference to locate the corresponding lines in the Object List 136 shown in FIG. 13. The corresponding lines in the Object List 136 are located in matched highlighted lines 1–3 in FIG. 13 (including the name 156, object category 158 and the Object Link 160). The flow diagram 180 then proceeds to a Box 198 as shown in FIG. 15.

Box 198 states that after the matched highlighted lines 1–3 in FIG. 13 of the Object List 136 are located, then send the object link 160 from the matched highlighted entry appearing on line 3 of FIG. 14 to the software associated with the web browser or other content viewing software (not shown). This action will then enable the display information 108 transmitted to the monitor screen 110 to be linked to another or external source 112 for retrieving additional information about the video image(s) from the external information source 112. However, if the No. 1 selection status 162 if FALSE (i.e., the Left mouse button has not been selected, actuated or clicked), then the flow diagram 180 proceeds from Box 194 to a Box 200. Box 200 states that if the No. 1 selection status 162 is FALSE, then send the name 156 of the character or object of interest from the matched highlighted entry appearing on line 3 of FIG. 11 (i.e., Mary, Mother of JESUS) to the monitor screen 110. This action will cause the name 156 of the character or object of interest to appear on the information bar (display information 108) of the monitor screen 110.

The present invention provides novel advantages over other conventional interactive systems and devices known in the prior art. A main advantage of the pointer interactive apparatus 100 of the present invention is that it enables a viewer to identify and to obtain information about a character or object appearing on the monitor screen 110 of a computing device 102 during a film presentation. A further advantage is that the present invention provides a mechanism for tracking the movement of the character or object of interest by comparing the pointer coordinates and current time code of the character or object with coordinate and time code data stored in data storage 116. Another advantage is that additional information about the character or object can be obtained via links to another and external information sources 112. The present invention creates an interactivity between the viewer, the video source 114 and an external source 112 such as an Internet web site or other software link.

As is clearly indicated from (a) the description of the interpreter 118 illustrated in FIG. 1, (b) the algorithmic equations 176 illustrated in FIG. 2d and in the Description of the Invention, and (c) the flow diagram illustrated in FIG. 15, a computer program is incorporated into the present invention. The computer program is custom designed for the present invention and the computer program listing is being submitted as part of the specification herein in accordance the Rules of Practice. The source code of the computer program will now be presented.

```
on Initialize
    global VideoSprite, ssLink, ssName
    set VideoSprite = 1 --The Sprite which contains the Video ActiveX Object
    put "" into field "TITLE"
    put "" into field "STATE"
    put "" into field "ElapsedTime"
    put "" into field "ObjectName"
    put "" into field "ObjectLink"
    put "" into field "ObjectList"
    put "" into field "EventList"
    put "" into field "TitleList"
    put "" into field "ObjectCoords"
    put "" into field "LargeLink"
    put "" into field "LargeName"
    set ssLink=list ("","","","","","","","","","")
    set ssName=list ("","","","","","","","","","")
    LoadData        -- Load TitleList, EventList and ObjectList
end on enterFrame - (MAIN LOOP)
```

```
    updateStatus         -- Update hardware status and information
    updateInteractivity  -- Use EventList to move clickable rectangles
    updateGrace          -- Let the link stay up for a short time
    updateVideoLinks     -- Show Time Based Title
    go to the frame      -- Loop
end on updateGrace          -- Let the link stay up for a short time
    global grace
    if grace > 0 and grace < 8 then
        set grace=grace-1
        if grace = 0 then
            set the text of member "objectLink" = ""
            set the text of member "objectName" = ""
            set the text of member "largeLink" = ""
            set the text of member "largeName" = ""
        end if
    end if
end on updateStatus         -- Update hardware status and information
    global etime, elapsedTime,x,seconds,h,m,s,q,r,p
    global VideoSprite, p2, pcount
    global s2,s, gotoDirection, gotoSeconds, stopSeconds, VideoState
    updateTime
    set p2=p
    set the text of member "ElapsedTime" = prepareTimeString( )
end on updateTime           -- convert from seconds into time-code format
    global elapsedTime,x,h,m,s,q,r,p, remainder
    set x = the currentTime of sprite 23
    set elapsedTime = x
    set h = integer(x/360000)
    set m = (elapsedTime - (h*360000))/60000
    set s = (elapsedTime - (h*360000) - (m*60000))/1000
    set p = (elapsedTime - (h*360000) - (m*60000) - (s*1000)) - s
    set p = integer (p/33.4)
    if p = 30 then set p = 29
    set remainder = p
end on prepareTimeString ee  -- display time-code format
    global elapsedTime,x,seconds,h,m,s,q,r,p,ts
    set ts = ""
    if h < 10 then
        set ts = "0"
    end if
    set ts = ts & string(h) & ":"
    if m < 10 then
        set ts = ts & "0"
    end if
    set ts = ts & string(m) & ":"
    if s < 10 then
        set ts = ts & "0"
    end if
    set ts = ts & string(s) & ":"
    if p < 10 then
        set ts = ts & "0"
    end if
    set ts=ts&string(p)
    return ts
end on elapsedToTime a      -- convert data from Time Code
                        -- source into time-code format
    set X = a/1000
    set p = integer (((a-(x*1000))/33.3))
    set seconds = x / 1000
    set h = integer(x/3600)
    set x = x - (h*3600)
    set m = integer(x/60)
    set s = x - (m*60)
        set ts = ""
    if h < 10 then
        set ts = "0"
    end if
    set ts = ts & string(h) & ":"
    if m < 10 then
```

-continued

```
            set ts = ts & "0"
        end if
        set ts = ts & string(m) & ":"
        if s < 10 then
            set ts = ts & "0"
        end if
        set ts = ts & string(s) & ":"
        if p < 10 then
            set ts = ts & "0"
        end if
        set ts=ts&string(p)
        return ts
end on timeToElapsed a      -- convert string into number
    set ts = a
    set h = chars(ts, 1,2)
    set m = chars(ts, 4,5)
    set s = chars(ts, 7,8)
    set p = chars(ts, 10,11)
    set e=(h*60000000)+(m*1000000)+(s*1000)+integer(p*33.3)
    return integer(e)
end on updateInteractivity    -- Use EventList to move clickable rectangles
    global ol, lol, seconds, ts, ss   -- ol=eventList, lol=lines in object list
    set ts="Searching . . ."
    set ss = 100 -- first sprite to set up
    getObjectLines
end on getObjectLines        -- Search EventList for relevant objects
    global author, ol, lol, seconds, ts, sslink, ssname, ss, remainder
    global ct, st, en, x1, x2, y1, y2, x1a, x2a, y1a, y2a, h, w, x, y
    set ct = (seconds*60)+remainder
    if lol > 2 then
        repeat with 1 = 3 to lol
            if word 1 of line 1 of ol = "s" or word 1 of line 1 of ol = "k" then
                set a = line 1 of ol
                set st=getTime (word 2 of a)
                if st<=ct then
                    set b = line 1+1 of ol
                    set en=getTime(word 2 of b)
                    if en>=ct then
                        set ts = a & RETURN & b & RETURN
                        set x1=value(word 3 of a)
                        set x2=value(word 5 of a)
                        set y1=value(word 4 of a)+73
                        set y2=value(word 6 of a)+73
                        set x1a=value(word 3 of b)
                        set x2a=value(word 5 of b)
                        set y1a=value(word 4 of b)+73
                        set y2a=value(word 6 of b)+73
                        getValues --do algorithmic equations
                        set the height of sprite ss=h
                        set the width of sprite ss=w
                        set the locH of sprite ss=x
                        set the locV of sprite ss=y
                        set ssName[ss-99]=word 7 to 999 of a
                        set sslink[ss-99]=setLink(ssName[ss-99])
                        set ss=ss+1
                        set 1=1+1
                    end if
                end if
            end if
        end repeat
        repeat with x=ss to ss+10
            set sslink[ss-99] =""
            set ssname[ss-99]=""
            set the locV of sprite x = -1000 --put rectangle out of reach
        end repeat
    end if
end on getValues         --Setup rectangle using algorithmic equations.
    global ct, st, en, x1, x2, y1, y2, x1a, x2a, y1a, y2a, h, w, x, y
    set pct=float(ct-st)/(en-st)
    set x = x1+((x1a-x1)*pct)
    set y = y1+((y1a-y1)*pct)
```

-continued

```
      set w = x2+((x2a-x2)*pct)-x
      set h = y2+((y2a-y2)*pct)-y
  end on setLink a           --Setup link from ObjectList
    set b = a
    global objectList
    set st = ""
    set l = the number of lines of objectList
    if l > 4 then
      repeat with x = 3 to l
        if line x of objectList = line 1 of b then
          set st = word 1 of line x+2 of objectList
          exit repeat
        end if
      end repeat
    end if
    return st
end on updateVideoLinks     --If in TitleList, display 'time based title'
    global linkString, titleList
    set t = the currentTime of sprite 23
    set TS = titleList
    set Title = ""
    repeat with x = 3 to the number of lines of TS
      set s = value(timeToElapsed(word 1 of line x of TS))
      set e = value(timeToElapsed(word 2 of line x of TS))
      if t>=s and t<e then
        set Title = word 3 to 99 of line x of TS
        set the text of member "Title" = Title
        set linkString = word 1 of line x+1 of TS
        set l = x-5
        set x = x + 1
      end if
    end repeat
end on go4it m, s           --Once Time Based Title or Object on-screen selected. . .
global linkString, eventListString
    if m = 0 then
      execute (linkString)
    else
      execute (eventListString, s)
    end if
end
```

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention. Accordingly,

What is claimed is:

1. A pointer interactive apparatus for use with a computing device comprising:

a video source for providing a video image on a monitor screen;

current time code means associated with said video source for providing a current time code as a time reference on said video source;

a pointer device cooperating with said current time code means for displaying identifying information of an object of interest on said video image over which said pointer device is hovering without actuating said pointer device;

data storage means for providing stored data for comparing with said current time code and a plurality of input signals from said pointer device; and interpreter means including a coordinate verification algorithm connected to receive said video image including said current time code, said input signals from said pointer device, and said stored data from said data storage means for identifying and tracking said object of interest on said video image.

2. The pointer interactive apparatus of claim 1 wherein said video source is a compact disk read-only memory (CD ROM).

3. The pointer interactive apparatus of claim 1 wherein said video source is a video home system (VHS).

4. The pointer interactive apparatus of claim 1 wherein said video source is a digital video disk (DVD).

5. The pointer interactive apparatus of claim 1 wherein said video source is a digital video tape.

6. The pointer interactive apparatus of claim 1 wherein said video source is a digital video memory source.

7. The pointer interactive apparatus of claim 1 wherein said video source is an analog video tape.

8. The pointer interactive apparatus of claim 1 wherein said pointer device is a computer mouse.

9. The pointer interactive apparatus of claim 1 wherein said interpreter means further includes a microprocessor.

10. The pointer interactive apparatus of claim 1 wherein said data storage means comprises a digital storage device.

11. The pointer interactive apparatus of claim 1 wherein said stored data of said data storage means is data specific to said video source.

12. The pointer interactive apparatus of claim 1 further including means for determining the coordinates of said pointer device positioned over said video image on said monitor screen.

13. The pointer interactive apparatus of claim 1 wherein said pointer device further includes a first actuator for connecting said interpreter means to an event list of said data storage means for obtaining information about said object of interest on said video image.

14. The pointer interactive apparatus of claim 1 wherein said pointer device further includes a second actuator for connecting said interpreter means to a title list of said data storage means for obtaining information about said object of interest on said video image.

15. A pointer interactive apparatus for use with a computing device comprising:

a video source for providing a video image on a monitor screen;

current time code means associated with said video source for providing a current time code as a time reference on said video source;

a pointer device cooperating with said current time code means for displaying identifying information of an object of interest on said video image over which said pointer device is hovering without actuating said pointer device;

data storage means for providing stored data for comparing with said current time code and a plurality of input signals from said pointer device;

interpreter means including a coordinate verification algorithm connected to receive said video image including said current time code, said input signals from said pointer device, and said stored data from said data storage means for identifying and tracking said object of interest on said video image; and means for displaying identifying information of said object of interest on said video image.

16. The pointer interactive apparatus of claim 15 wherein said means for displaying identifying information comprises an information bar.

17. The pointer interactive apparatus of claim 15 further including means for linking information transmitted to said monitor screen to an external source for retrieving additional information about said object of interest on said video image from said external source.

18. A pointer interactive apparatus for use with a computing device comprising:

a video source for providing a video image on a monitor screen;

current time code means associated with said video source for providing a current time code as a time reference on said video source;

a pointer device cooperating with said current time code means for displaying identifying information of an object of interest on said video image over which said pointer device is hovering without actuating said pointer device;

data storage means for providing stored data for comparing with said current time code and a plurality of input signals from said pointer device; and interpreter means including a coordinate verification algorithm connected to receive said video image including said current time code, said input signals from said pointer device, and said stored data from said data storage means for identifying and tracking said object of interest on said video image wherein said coordinate verification algorithm is $$a_1 = x_1 + [(x_2 - x_1)(c_t - (t_2 - t_1))] \qquad [1]$$

$$b_1 = y_1 + [(y_2 - y_1)(c_t - (t_2 - t_1))] \qquad [2]$$

$$c_1 = w_1 + [(w_2 - w_1)(c_t - (t_2 - t_1))] \qquad [3]$$

$$d_1 = h_1 + [(h_2 - h_1)(c_t - (t_2 - t_1))] \qquad [4]$$

wherein $[(x_1, y_1), (w_1, h_1)]$ is a coordinate pair of a known starting point at a current time code $(t_2)$ in seconds, and $[(x_2, y_2), (w_2, h_2)]$ is a coordinate pair of a known ending point at a current time code $(t_2)$ in seconds, and $[(a_1, b_1), (c_1, d_1)]$ is a coordinate pair of said object of interest appearing on said monitor screen between said known starting point and said known ending point at a current time code $(c_t)$ in seconds.

* * * * *